US011930898B1

(12) United States Patent
Carstens

(10) Patent No.: US 11,930,898 B1
(45) Date of Patent: Mar. 19, 2024

(54) STORAGE CONTAINER FOR CANES AND WALKERS

(71) Applicant: Phillip Carstens, Springfield, VA (US)

(72) Inventor: Phillip Carstens, Springfield, VA (US)

(*) Notice: Subject to any disclaimer, the term of this patent is extended or adjusted under 35 U.S.C. 154(b) by 227 days.

(21) Appl. No.: 17/591,821

(22) Filed: Feb. 3, 2022

(51) Int. Cl.
*A45B 1/00* (2006.01)
*A61H 3/00* (2006.01)

(52) U.S. Cl.
CPC ................. *A45B 1/00* (2013.01); *A61H 3/00* (2013.01); *A61H 2003/002* (2013.01)

(58) Field of Classification Search
CPC ............................ A45B 1/00; A61H 2003/002
USPC .................................................. 224/407, 558
See application file for complete search history.

(56) References Cited

U.S. PATENT DOCUMENTS 1,609,466 A * 12/1926 Dempsey .................. B60R 9/02 224/558
2,311,049 A * 2/1943 Hedden .................... A61H 3/02 224/0.5
2,750,951 A * 6/1956 Barnwell ................. A61H 3/02 135/66
4,449,750 A * 5/1984 Pultman ................... A61G 5/10 224/558
4,491,257 A * 1/1985 Ingles ...................... A61H 3/00 297/188.2
4,659,099 A 4/1987 Malone
4,800,911 A * 1/1989 Endres ..................... A61H 3/00 D12/130
5,480,079 A * 1/1996 Douglass ................. A61G 5/10 224/558
5,901,891 A * 5/1999 Douglass ................. A61G 5/10 224/558
6,601,813 B1 * 8/2003 Kager .................... F16M 13/00 248/314
8,814,182 B1 8/2014 Kirby
9,271,884 B2 * 3/2016 Mitchell .................. A61G 5/10
11,583,466 B1 * 2/2023 McGee ...................... F21S 9/02
11,668,333 B2 * 6/2023 Cupit ................... F16M 13/022 248/231.71
2006/0090783 A1 * 5/2006 King-Fai .................. A45B 1/00 135/65
2008/0296454 A1 * 12/2008 Carnevali .......... F16M 11/2078 224/558
2014/0166711 A1 * 6/2014 Mitchell .................. A61G 5/10 224/407
2015/0001359 A1 * 1/2015 Catchings ............. F16M 11/14 248/220.22

* cited by examiner

*Primary Examiner* — Noah Chandler Hawk
(74) *Attorney, Agent, or Firm* — Sanchelima & Associates, P.A.; Christian Sanchelima; Jesus Sanchelima

(57) ABSTRACT

A storage container including a mobility aid assembly, a container assembly and a clamping assembly. The mobility aid includes a cane and a walker with a frame. The container assembly includes a container to store small objects. The container has an inclined opening. The clamping assembly includes a clamping member that allows the container to be attached to the frame or to the cane. The clamping assembly can be rotated to orientate the storage container to the cane or to the frame, either in vertical or horizontal position.

4 Claims, 5 Drawing Sheets

STORAGE CONTAINER FOR CANES AND WALKERS

BACKGROUND OF THE INVENTION

1. Field of the Invention

The present invention relates to storage containers for canes and walkers and, more particularly, to a storage container for canes and walkers that has a container that has a clamper member for attaching to canes and walkers.

2. Description of the Related Art

Several designs for storage containers for canes and walkers have been designed in the past. None of them, however, include a container having a pivoting clamping member that allows the receptacle to be positioned and attached to a walker or a cane.

Applicant believes that a related reference corresponds to U.S. Pat. No. 4,659,099 issued for a food tray that can be clamped onto a wheelchair or walker. Applicant believes that another related reference corresponds to U.S. Pat. No. 8,814,182 issued for a walker with removeable utility tray. None of these references, however, teach of a storage container for canes and walkers that includes a storage container for small objects, the container can be attached to a cane or mobility walker, the container has a receptacle with a screw style clamping member to attach the receptacle to the frame of the walker or cane.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a storage container for canes and walkers that includes a receptacle to store small objects such as remote controls, toiletries, mails, or the like.

It is another object of this invention to provide a storage container for canes and walkers that includes a clamper that can rotate to position the container into a cane, a walker or any other mobility aids.

It is still another object of the present invention to provide a storage container for canes and walker including the clamper wherein the clamper has a grip lined with a sticky material for additional gripping.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
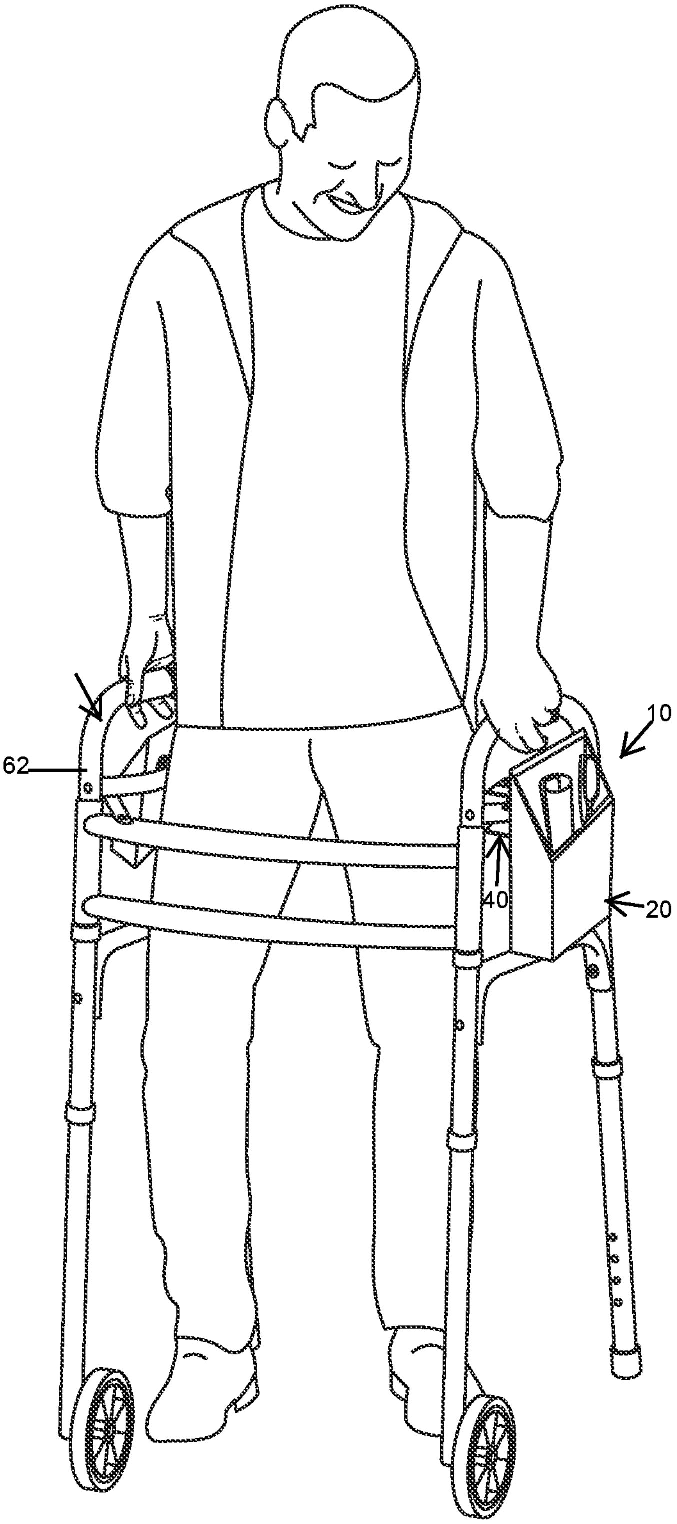
FIG. 1 represents an isometric operational view of the present invention 10 mounted to a walker 64. The user can carry articles in the container assembly 20 so the user can use the hands to support himself to the walker 62.

Referring now to the drawings, where the present invention is generally referred to with numeral 10, it can be observed that it basically includes a container assembly 20, a clamping assembly 40 and a mobility aid assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The container assembly 20 includes container 21. In one embodiment, the container 21 may include rear wall 22, left wall 23, right wall 24, front wall 25 and bottom wall (not shown in the drawings). Rear wall 22 may have a substantially rectangular shape. It also may be suitable to have rear wall 22 with other shapes such as squared shape, oval shape, elliptical shape, or any other suitable shape. The front wall 25 may also have a rectangular shape. It also may be suitable to have the front wall 25 having any other shape such as oval shape, elliptical shape, triangular shape, polygonal shape, or any other suitable shape. Preferably, the front wall 25 may have a smaller height than the rear wall 22. The left wall 23 and the right wall 24 may have a lower portion having a rectangular shape and an upper portion with a triangular shape, wherein a rear portion of the left wall 23 and right wall 24 has a larger height than a front portion of the left wall 23 and right wall 24. The rear portion of the right wall 24 and the rear portion of the left wall 23 may have same height as the rear wall 22. The front portion of the right wall 24 and the front portion of the left wall 23 may have same height as the front wall 25 defining a container 21 with an inclined opening on the top of the container 21. The inclined opening of the container 21 may provide an easier access to the interior of container 21.

Figure 4:
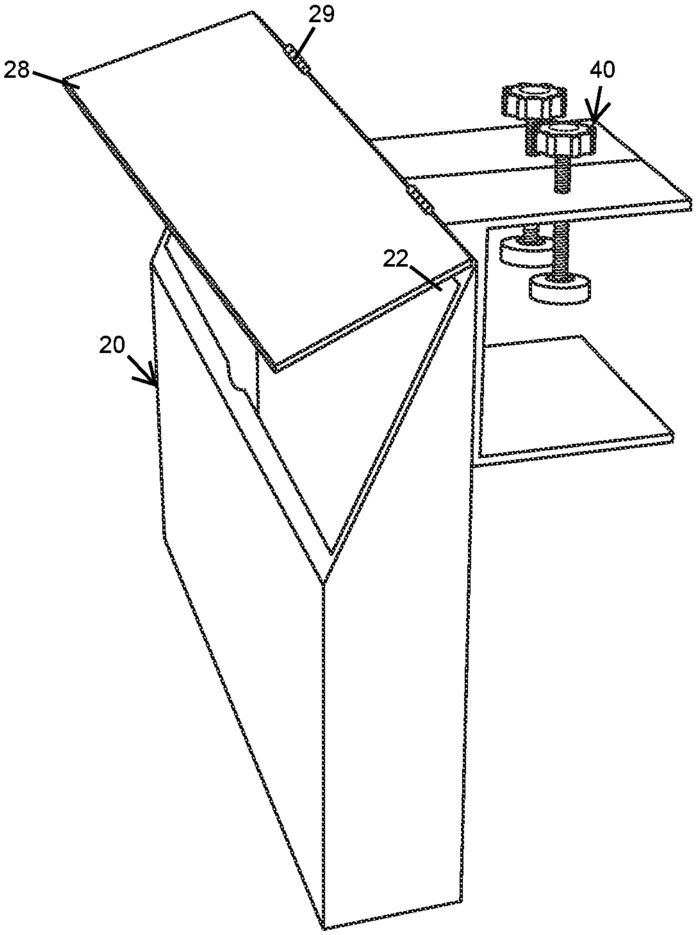
FIG. 4 is a representation of an alternative embodiment of the container assembly 20 including a lid 28 pivotally connected to the rear wall 22.

In an alternative embodiment, the container assembly 20 may further include a lid 28 as observed in FIG. 4. In one embodiment, the lid 28 may have a rectangular shape. It should be understood that the lid 28 may have any other suitable shape such as elliptical shape, triangular shape, irregular shape or any variation thereof. The lid 28 may be planar. The lid 28 may be hingedly attached to an upper edge of the rear wall 22 using hinges 29. The lid 28 may entirely cover the inclined opening of the container 21. The lid 28 may provide more security to the items stored into the container 21. The container 21 may be designed to carry small items such as toiletries, remote controls, cellphones, keys, papers, or the like. It should be understood that variations of the container 21 may include containers with different dimensions and shapes such that the container 21 may receive any other object. It also may be suitable to have a container 21 with designs for kids. It also may be suitable to have a container 21 with an extra pocket or the like to store additional items. It also may be suitable to have a container 21 with separations to receive different items and separate them. The container 21 may be made of a plastic, wood, or any other light and resistant material.

Figure 3:
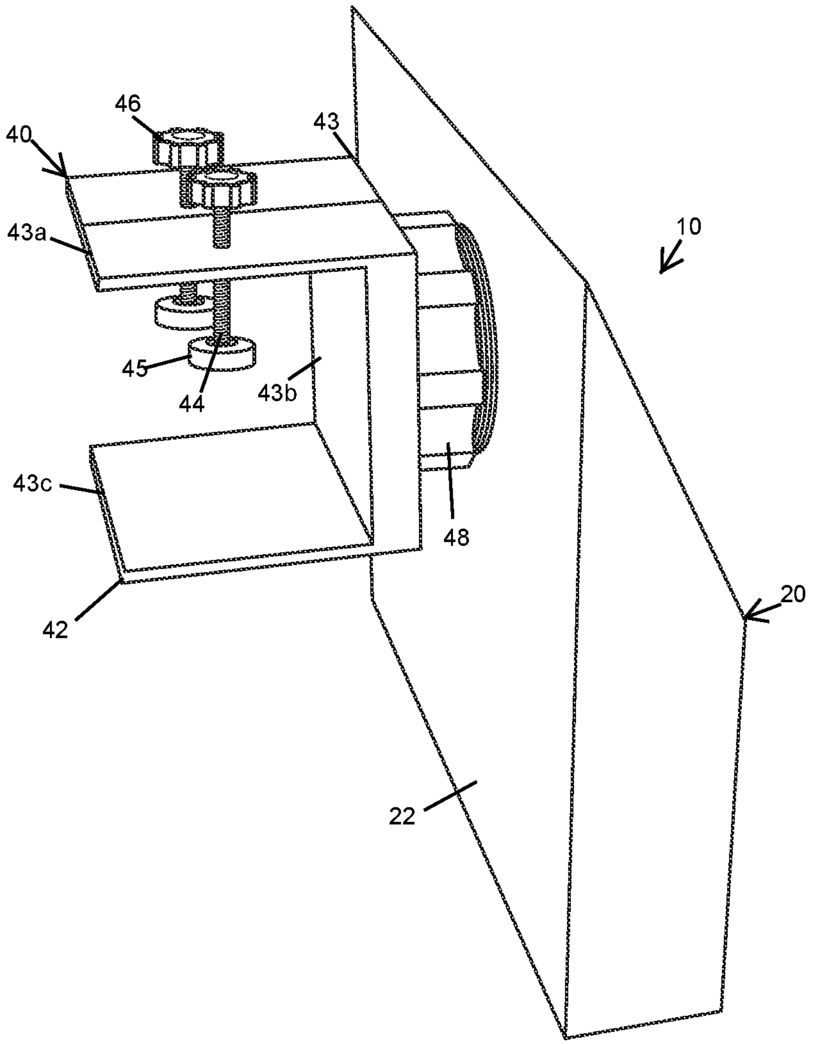
FIG. 3 illustrates a rear isometric view of the present invention 10 showing the clamping assembly 40 including the clamping member 42 attached to rear wall 22 using the attaching member 48.

The clamping assembly 40 may include clamping member 42. Best observed in FIG. 3, the clamping member 42 may include a frame 43, screws 44, jaws 45 and handles 46. In one embodiment, the frame 43 may have a first member **43*a*, a second member 43*b* and a third member 43*c*. The first member 43*a* and the third member 43*c* may have a rectangular planar shape. It should be understood that the first member 43*a* and the third member 43*c* may have any other shapes such as circular shapes, elliptical shape, oval shape, triangular shape, trapezium shape, polygonal shape, or the like. The first member 43*a* and the third member 43*c* may have substantially same length, thickness and width. The second member 43*b* may also have rectangular shape. It also may be suitable to have the second member 43*b* with other shapes. The first member 43*a* may be perpendicularly connected to an upper edge of the second member 43*b*. The third member 43*c* may be perpendicularly connected to a lower edge of the second member 43*b*. The third member 43*c* and the first member 43*a* may be parallel facing one to each other. The second member 43*b* may have a bigger thickness than the first member 43*a* and the third member 43*c***.

The first member **43*a* may have openings to receive the screws 44 therein. In one embodiment, the clamping member 42 has two screws 44 for a better gripping. It should be understood that variations of the clamping member 42 may include more or less than two screws 44. Lower end of each screw 44 may have a jaw 45 coupled therein. The jaw 45 may have a circular shape to cover a wider area of gripping. Other embodiments of the clamping member 45 may include jaws 45 with a different shape such as polygonal shapes, irregular shapes or the like. The jaws 45 may be movable jaws to allow a better fitting with the third member 43*c*. An upper end of each screw 44 may have one handle 46 attached therein. The handles 46 may allow a user to twist the screws to push the jaws 45 towards the third member 43*c* for clamping the clamping member 42 to a surface. The jaws 45 may be provided with a layer of a material to provide additional traction. In one preferred embodiment, the jaws 45** may be provided with silicone that may be wiped with a damp cloth to regain grip after repetitive use.

The clamping assembly 40 may further include an attaching member 48. The attaching member 48 may connect the second wall **43*b* of the clamping member 42 to the rear wall 22 of the container 21. The attaching member 48 may include a mechanism that allows to rotate the container 21 with respect to the clamping member 42. In one embodiment, the attaching member 48 may be the mechanism of an adjustable garden hose nozzle. It should be understood that the attaching member 48 may be any other adjustable mechanism that allows a rotation along an axis. In one embodiment, the attaching member 48 allows the clamping member 42 to rotate each 45 degrees till 360 degrees. It also may be suitable to have the attaching member 48 rotating each 90 degrees or any other rage to allow positioning the container 21 in a suitable position for clamping the container into the mobility aid assembly 60**.

Figure 1A:
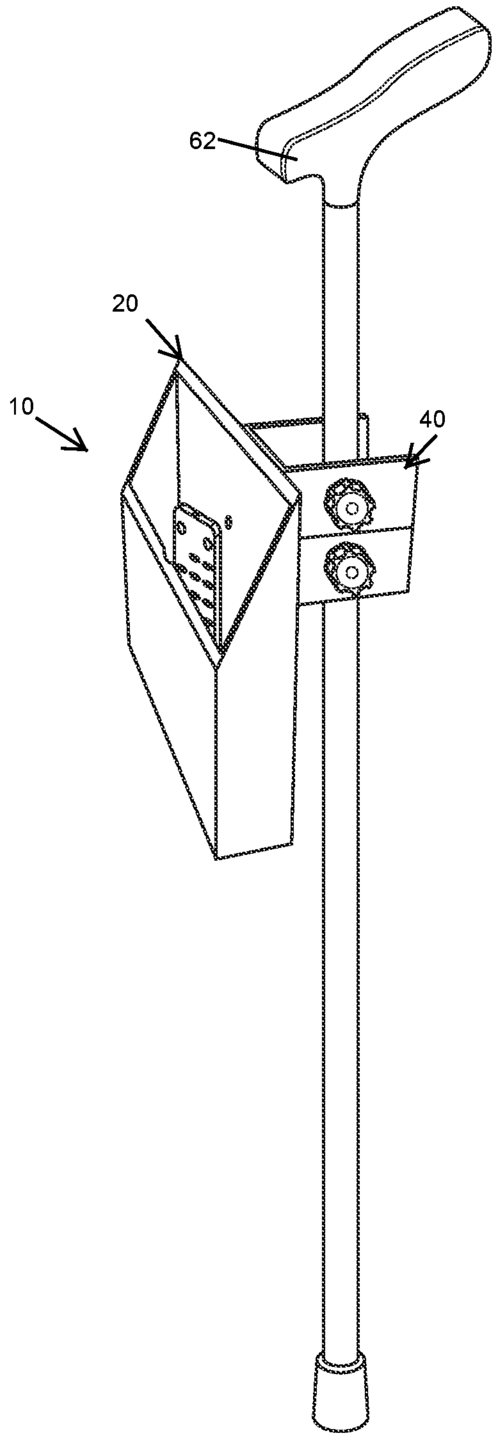
FIG. 1A is an isometric operational view of the present invention 10 mounted to a cane 62. The clamping assembly 40 is rotated respect to the container assembly 20 to attach the container assembly 20 to the cane 62.
Figure 2:
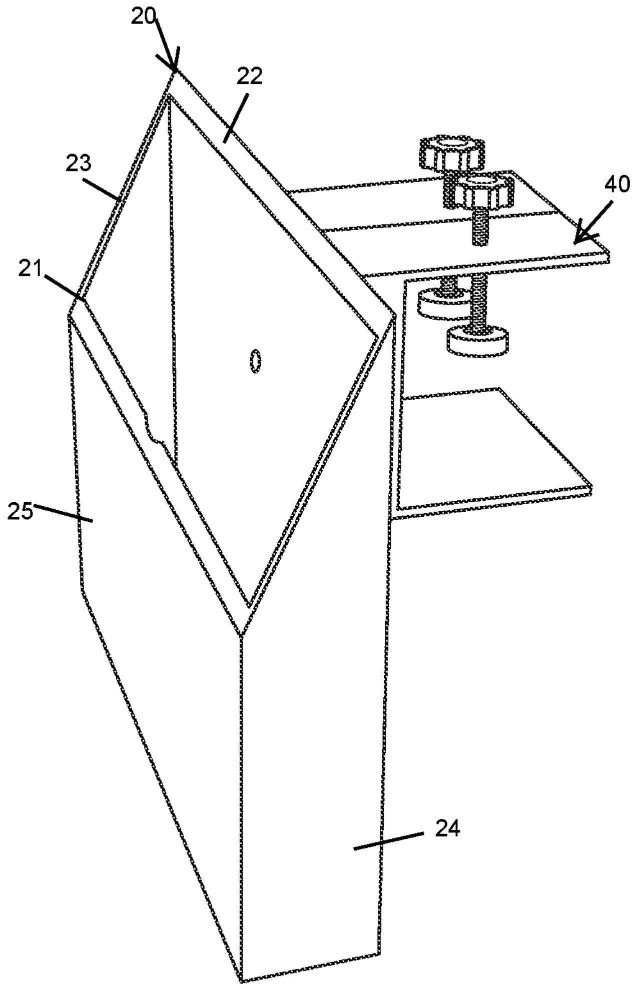
FIG. 2 shows an isometric view of one of the preferred embodiments of the container assembly 20 including container 22. The container 22 includes an inclined opening for an easy access to interior of the container 22.

Referring now to FIGS. 1 and 1A, the container assembly 20 may be attached to the mobility aid assembly 60. The mobility aid assembly 60 may include cane 62 and walker 64. It should be understood that the mobility aid assembly 60 may also include crutches, wheel-chairs, or any other mobility aid. The container assemblies 20 may be attached to any horizontal support pipe of the walker 64. A user may rotate the clamping assembly 40 to a suitable position to attach the container assembly 20 to one of the pipes of the walker 64 so the user can user the hands to use the walker while the container carries items. Multiple containers 21 may be attached to the frame of the walker 64. To attach the container assembly 20 to the cane 62, the clamping assembly 40 may be rotated about 90 degrees to accommodate the container assembly 20 to the vertical pipe of the cane.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A storage container system for canes and walkers, comprising:

A) a mobility aid assembly including a walker and a cane, said walker including a frame;

B) a container assembly including a container and a lid, said container is a storage container configured to store objects, said container has a shape of a box, wherein the container has a front wall with a smaller height than a rear wall of the container, defining an inclined opening, wherein said lid is hingedly connected to the rear wall of the container;

C) a clamping assembly including a clamping member that allows the container to be attached to said frame or said cane, wherein said clamping member has a frame having a vertical member with a first horizontal member perpendicularly attached to an upper portion of the vertical member and a second horizontal member perpendicularly attached to a lower portion of the vertical member, wherein said clamping member further includes screws coupled to the frame, each of the screws has a jaw at one distal end and a handle at another distal end, wherein the jaw has a layer of silicone for additional gripping, wherein said jaw has a cylindrical shape and said handle has a cylindrical shape with protruding member which define a top circular profile with arc cutouts along its periphery, wherein said frame member has a rectangular shape with planar outer surface.

2. The storage container system for canes and walkers set forth in claim 1, wherein the clamping assembly further includes an attaching member that connects the clamping member to the container.

3. The storage container system for canes and walkers set forth in claim 2, wherein said attaching member allows rotating the container respect to the clamping member.

4. A storage container system for canes and walkers, consisting of:

A) a mobility aid assembly including a walker and a cane, said walker including a frame;

B) a container assembly including a container, said container is a storage container configured to store objects, said container has a shape of a box, wherein the container assembly further includes a lid, said lid is hingedly connected to a rear wall of the container;

C) a clamping assembly including a clamping member that allows the container to be attached to said frame or said cane, wherein said clamping member has a frame having a vertical member with a first horizontal member perpendicularly attached to an upper portion of the vertical member and a second horizontal member perpendicularly attached to a lower portion of the vertical member, wherein said clamping member further includes two screws coupled to the frame, each of the two screws has a jaw at one distal end and a handle at another distal end, wherein the jaw has a layer of silicone for additional gripping, wherein the clamping assembly further includes an attaching member that connects the clamping member to the container, wherein said attaching member allows rotating the container respect to the clamping member, wherein said jaw has a cylindrical shape and said handle has a cylindrical shape with protruding member defining a top circular profile with arc cutouts along its periphery, wherein said frame member has a rectangular shape with planar outer surface, wherein said vertical member has a width bigger than a width of said first horizontal member and said second horizontal member.

* * * * *